United States Patent [19]

Frankenthal et al.

[11] 3,793,074

[45] Feb. 19, 1974

[54] MANUFACTURING OF MAGNETIC RECORDING MEDIA

[75] Inventors: Karl Uhl Frankenthal; Georg Schnell; Job-Werner Hartmann; Heinz Stritzinger, all of Ludwigshafen; Werner Balz, Willstaett; Rainer Pruegl, Hiltrup, all of Germany

[73] Assignee: Badische Anilin- & Soda-Fabrik Aktiengesellschaft, Ludwigshafen/Rhein, Germany

[22] Filed: Jan. 13, 1972

[21] Appl. No.: 217,657

[52] U.S. Cl. ............... 117/235, 252/62.54, 260/843

[51] Int. Cl. ............... H01f 10/02

[58] Field of Search ............... 117/235–240; 252/62.54; 260/843

[56] References Cited

UNITED STATES PATENTS

| | | | |
|---|---|---|---|
| 3,427,191 | 2/1969 | Howell et al. | 252/62.54 X |
| 3,634,185 | 1/1972 | Faber | 117/235 X |
| 3,366,505 | 1/1968 | Bisschops | 117/235 UX |
| 3,660,327 | 5/1972 | Loncrini et al. | 260/843 X |
| 3,647,539 | 3/1972 | Weber | 252/62.54 X |
| 3,560,388 | 2/1971 | Higashi | 117/235 X |

*Primary Examiner*—Murray Katz
*Assistant Examiner*—Bernard D. Pianalto
*Attorney, Agent, or Firm*—Johnston, Root, O'Keefe, Keil, Thompson and Shortleff

[57] ABSTRACT

Manufacture of magnetic recording media by preparing a dispersion of particulate magnetic pigment in a binder based on a mixture of polycondensates with the addition of organic solvents and, optionally, conventional additives, applying a coating of said dispersion to the substrate and finally drying or curing the coating. The binder used for the dispersion of magnetic pigment consists of a mixture of phenol/formaldehyde condensates and thermoplastic polyester of terephthalic and isophthalic acids and ethylene glycol and neopentyl glycol.

4 Claims, No Drawings

MANUFACTURING OF MAGNETIC RECORDING MEDIA

This invention relates to the manufacture of magnetic recording media by preparing a dispersion of particulate magnetic pigment in a specific binder based on a mixture of polycondensates with the addition of organic solvents and, optionally, conventional additives, and applying a coating of said dispersion to the substrate followed by drying or curing of the coating.

It is known to make magnetic recording media by coating substrates, such as films, tapes or discs of plastics or non-magnetizable metals, with a dispersion of a particulate magnetic pigment, which must possess certain minimum magnetic values, in a binder and organic solvents. In the manufacture of magnetic discs for use in data storage, in particular, a great deal is required of the generally thin coating. The finished coating is required to show good adhesion to the substrate and high resistance to solvents, heat, moisture and, above all, abrasion. The coating containing the magnetic pigment embedded in binder must be very hard yet not brittle but elastic. Thus the binder used in the coating primarily determines the properties of the magnetizable film. It is known to use epoxy resins, phenol/-formaldehyde condensates and various vinyl copolymers and also mixtures thereof as binders for use in magnetizable coatings. For example, U.S. Pat. No. 2,914,480 recommends the combination of butylated melamine/formaldehyde resins with polyvinyl butyral and German Pat. No. 1,274,443 the combination of epoxy resins, phenol/formaldehyde condensates and polyvinyl methyl ether as a thermosetting binder for magnetic discs. In the preparation of liquid coating compositions or dispersions of magnetic pigments it is known to incorporate, in addition to the magnetic pigment itself and the binder, auxiliaries such as silicones, waxes or fatty acid esters which have partly a dispersing action and partly a smoothing effect to improve the sliding properties of the finished magnetizable coating with relation to the magnetic head. However, the prior art binders do not adequately satisfy all practical requirements. Some are difficult to process, whilst others still have unsatisfactory magnetic values or chemical and machenical properties after drying and after-treatments. Moreover, absolute constancy of the particular magnetic values of the resulting magnetic recording media is not always assured when using some of the coating compositions.

It is an object of the present invention to provide an improved binder for use in the manufacture of magnetic recording media, particularly magnetic discs, wherein the resulting magnetizable layers exhibit excellent magnetic properties and also, in particular, very high abrasion resistance and good elasticity.

We have found that magnetic recording media may be particularly advantageously manufactured by preparing a dispersion of particulate magnetic pigment in a binder based on a mixture of polycondensates with the addition of organic solvents and, optionally, conventional additives, and applying a coating of said dispersion to the substrate followed by drying or curing of the said coating, provided that the binder used for the dispersion of magnetic pigment is a mixture of A. from 45 to 75 percent and in particular from 55 to 70 percent, by weight of a curable phenol/formaldehyde condensate which is soluble in organic solvents and which has been prepared in the presence of basic catalysts, and B. from 55 to 25 percent and in particular from 30 to 45 percent, by weight of a thermoplastic polyester of from 0.5 to 1.5 moles of terephthalic acid and from 0.5 to 1.5 moles of isophthalic acid and from 0.5 to 1.5 moles of ethylene glycol and from 0.5 to 1.5 moles of neopentyl glycol, the molar ratio of the dicarboxylic acids to the glycols being from about 0.8:1 to 1.2:1.

Suitable curable phenol/formaldehyde condensates which are soluble in organic solvents such as alcohol or acetone are any of the known commercial condensation products of phenols with formaldehyde which have been prepared in the presence of basic catalysts and are known as resols. They generally contain methylol groups which may be free or partly or completely etherified or esterified with aliphatic alcohols or aliphatic monocarboxylic acids of from one to 18 carbon atoms. We prefer to use resols which are non-plasticized or only slightly plasticized. Preferred suitable phenols are phenol and $C_{1-8}$ alkyl phenols such as p-tert-butyl phenol, although for example cresol and bis(p-hydroxyphenyl)methane and mixtures of these compounds are also suitable. Details of the manufacture of such phenol/formaldehyde condensates are given in the relevant handbooks such as Houben-Weyl "Methoden der organischen Chemie", 4th Ed., Vol. XIV/2, 1963, pp. 220 to 257.

The polyesters included as ingredients of the binder in the present invention are also described as such in the literature. Preferred polyesters contain the terephthalic and isophthalic acids in approximately equimolar amounts and from 1 to 1.6 moles of neopentyl glycol per mole of ethylene glycol. For example, a preferred polyester consists of 1 mole of terephthalic acid, 1 mole of isophthalic acid, 0.7 mole of ethylene glycol and from 1.2 to 1.3 moles of neopentyl glycol. The preparation of the polyesters used in the present invention may also be effected by prior art methods, for details of which see Houben-Weyl, 4th Ed., Vol. XIV/2, pp. 12 et seq.

The binders are conveniently used in the form of approx. 20 to 40 percent solutions in suitable conventional solvents such as methyl ethyl ketone, ethyl glycol acetate or mixtures of xylene and butanol. It has been found advantageous to add a small amount, i.e. from about 1 to 4 percent by weight based on the total binder, of a suitable silicone resin, for example a methyl silicone resin having a viscosity of from 0.5 to 300 centipoise.

The particulate magnetic pigments which are dispersed in said binders in the present invention to form the magnetizable coating are any of the magnetic pigments commonly used in magnetic recording media. Specific examples thereof are acicular $\gamma$-iron(III) oxide having an average particle length of from 0.1 to 2 $\mu$ and preferably from 0.1 to 0.9 $\mu$, cubic $\gamma$-iron(III) oxide, mixtures of oxides of divalent and trivalent iron and also mixtures of oxides of iron with oxides of other metals, ferromagnetic chromium dioxide as well as those particulate alloys of heavy metals, particularly iron, cobalt and/or nickel, which are known to be useful for this purpose. In general, the amount of magnetic pigment used is from about 2.5 to 4.5 parts and preferably about 3 parts per part of binder (A + B), by weight.

Conventional auxiliaries or additives may be added to the dispersion of magnetic pigment in binder in known manner, examples being plasticizers, lubricants such as isopropyl myristinate, flow improvers and, in minor quantities, even other binders such as alkyd resins, epoxy resins or polyacrylates, particularly curable polyacrylates, where it is desired to slightly modify the properties of the coating composition. Suitable bases or substrates for use in the magnetic recording media of the invention are the conventional flexibel or rigid bases such as webs or tapes based on polyethylene terephthalate and other substrates of non-magnetizable materials provided they can withstand the drying and curing treatment of the magnetizable coating without deforming. Preferred are rigid bases of non-magnetizable metals, for example discs of aluminum or aluminum alloys.

The preparation of the liquid coating compositions, i.e. the dispersion of particulate magnetic pigment in the binder, is carried out by dispersing said magnetic pigment in the binder and a sufficient quantity of solvent by any conventional dispersing process, using for example a ball mill containing steel or porcelain balls. In general, suitable solvents are alcohols, ketones, esters, ethers, glycol ether esters, aromatic hydrocarbons and mixtures of such solvents, provided they are capable of dissolving the binder mixtures used in the invention. In one method, the binder is first of all dissolved alone and the magnetic powder then predispersed in the solution. Alternatively, the binder, magnetic pigment and solvent may be directly mixed in the dispersing apparatus. During the dispersing operation in the ball mill, any further components of the dispersion may be advantageously added at this stage either in solid form or in the form of solutions. Thus it is advantageous to add to the mixture small quantities of ground, predispersed particles of non-magnetizable hard materials having an average particle size of from 2 to 8 $\mu$. Such materials generally have a Mohs hardness of more than 6 and an average particle size of from 2 to 8 $\mu$. Suitable materials are electrocorundum powder, quartz powder, boron nitride powder, etc.

Dispersion of the liquid coating composition is continued until the peak-to-valley height of a test coating is less than 0.1 $\mu$. Mixing times of from 24 to 96 hours are usually sufficient. In order to achieve flawless magnetizable coatings it is advantageous to carry out thorough filtration of the liquid coating compositions before the coating operation.

Coating of the bases may be carried out in known manner. Coating of the preferred bases, i.e. drums or discs of aluminum or aluminum alloys, is advantageously carried out by centrifugal casting in the manner described in U.S. Pat. No. 2,913,246. After coating, the magntic recording media are dried and cured, i.e. subjected to heat treatment. Thermal curing is generally effected at temperatures between 120° and 250°C for from about 20 to 90 minutes, the time required depending primiarly on the temperature used. In some cases it may be advantageous to subject the magnetizable coatings to a final annealing treatment over a long period and/or to subject the coating to pressing treatment after drying by passing them between rollers which may or may not be heated. In the manufacture of magnetic discs it is generally advantageous to subject the discs to a final buffing and polishing treatment in suitable apparatus in order to obtain flawless coatings.

The magnetic recording media produced by the method of the invention combine a number of very useful properties. They show good sensitivity, a good frequency response range and very good adhesion of the magnetizable coating to the substrate. They are particularly notable for the excellent abrasion resistance of the magnetizable coatings. In this respect, the magnetic discs prepared by the method of the invention are distinctly superior to commercially available magnetic discs.

In the following example the parts and percentages are by weight.

EXAMPLE 570 parts of acicular $\gamma$-iron(III) oxide having an average particle length of 0.3 $\mu$ are dispersed in 1,180 parts of a mixture consisting of 22 percent of a curable, methylol group-containing phenol/formaldehyde condensate of the resol type, which is soluble in alcohol and which is of low molecular weight and has been prepared in the presence of basic catalysts, 10 percent of a thermoplastic polyester consisting of 1 mole of terephthalic acid, 1 mole of isophthalic acid, 0.7 mole of ethylene glycol and 1.2 moles of neopentyl glycol, and 68 percent of ethyl glycol acetate with the addition of 11 parts of a methyl silicone resin for 3 days in a cylindrical ball mill containing 600 parts of 6 mm steel balls as grinding medium. A further 800 parts of the above binder mixture are then added and dispersion is continued for a further 4 hours. The resulting magnetizable dispersion is then pressure-filtered through a paper filter and coated onto round aluminum discs having a diameter of 14 inches and a thickness of 1.2 mm using the aforementioned centrifuging process. The resulting coating is then dried for 1 hour at 200°C. The thickness of the dried coating is from 2 to 3.5 $\mu$. The resulting magnetic discs are then polished with diamond powder to achieve a peak-to-valley height in the coating of 0.08 $\mu$.

The magnetic discs thus obtained are tested in commercial drives. In these tests, it is seen that the sensitivity frequency response range and the peak of the writing current curve are at least equal to the corresponding properties of a commercial magnetic disc. The abrasion resistance of the magnetic discs produced according to the above Example is distinctly superior to that of a commercial magnetic disc. The abrasion resistance is tested as follows: the magnetizable coating is set at an angle of 45° to the vertical and quartz sand having a particle size of from 0.1 to 1.5 mm is caused to fall onto the magnetizable coating from a height of 40 cm, the sand being guided over a distance of 30 cm in a tube having an internal diameter of 10 mm, the bottom end of the tube being 10 cm above the specimen. The time required to remove the magnetizable coating so as to reveal the base over the area tested is measured and the results are given in relation to the thickness of the coating. Tests on the magnetic disc produced by the method of the invention as described in the above Example give values of 28.0 seconds/$\mu$, whilst commercial magnetic discs give values ranging from 14 to 19 sec/$\mu$. Tests on the adhesion of the magnetic coatings by bending the disc over a mandrel having a diameter of 10 mm show that the magnetic coatings produced according to the above Example have a bond strength which is equal to or better than that of commercial magnetic discs.

We claim:

1. In a process for the manufacture of magnetic recording media which comprises: preparing a dispersion of particulate magnetic pigment in a binder based on a mixture of polycondensates with the addition of organic solvents, applying a coating of said dispersion to a rigid substrate of a non-magnetizable metal, and thereafter drying and thermally curing said coating at a temperature of from 120 to 250°C, the improvement wherein the binder used for the dispersion of magnetic pigment is a mixture of A. from 45 to 75 percent by weight of a curable phenol/formaldehyde condensate which is soluble in organic solvents and which has been prepared in the presence of basis catalysts; and B. from 55 to 25 percent by weight of a thermoplastic polyester of from 0.5 to 1.5 moles of terephthalic acid, from 0.5 to 1.5 moles of isophthalic acid, from 0.5 to 1.5 moles of ethylene glycol and from 0.5 to 1.5 moles of neopentyl glycol, the molar ratio of the dicarboxylic acids to the glycols being from about 0.8:1 to 1.2:1.

2. A process as set forth in claim 1 wherein the amount of B is from 30 to 45 percent.

3. A process as set forth in claim 1 wherein said rigid substrate is an aluminum or aluminum alloy disc.

4. A process as set forth in claim 1 wherein the amount of A is from 55 to 70 percent.

* * * * *

UNITED STATES PATENT OFFICE
CERTIFICATE OF CORRECTION

Patent No. 3,793,074 Dated February 19, 1974

Inventor(s) Karl Uhl et al.

It is certified that error appears in the above-identified patent and that said Letters Patent are hereby corrected as shown below:

First page, left-hand column, heading, second line, "Frankenthal et al." should read -- Uhl et al. --.

First page, left-hand column, third line, "Karl Uhl Frankenthal;" should read -- Karl Uhl, Frankenthal; --.

Column 1, line 45, "machenical" should read -- mechanical --.

Column 3, line 59, "primiarly" should read -- primarily --.

Signed and sealed this 7th day of January 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,793,074 Dated February 19, 1974

Inventor(s) Karl Uhl et al.

It is certified that error appears in the above-identified patent and that said Letters Patent are hereby corrected as shown below:

On the cover sheet insert:

-- [30] Foreign Application Priority Data

January 15, 1971 Germany P 21 01 697.7 --.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*